United States Patent
Suese

(10) Patent No.: US 9,098,197 B2
(45) Date of Patent: Aug. 4, 2015

(54) OPERATION APPARATUS, IMAGE FORMING APPARATUS, DISPLAY CONTROL METHOD, AND MEDIUM FOR RECORDING PROGRAM

(75) Inventor: Narihiko Suese, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 17 days.

(21) Appl. No.: 13/559,072

(22) Filed: Jul. 26, 2012

(65) Prior Publication Data

US 2013/0033716 A1 Feb. 7, 2013

(30) Foreign Application Priority Data

Jul. 29, 2011 (JP) .................. 2011-166521

(51) Int. Cl.
*G06F 3/12* (2006.01)
*G06F 3/0488* (2013.01)
*G03G 15/00* (2006.01)
*G06K 15/00* (2006.01)

(52) U.S. Cl.
CPC .......... *G06F 3/04886* (2013.01); *G03G 15/502* (2013.01); *G06K 15/005* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 2006/0227343 A1* | 10/2006 | Yamaguchi ..................... | 358/1.1 |
| 2007/0124675 A1* | 5/2007 | Ban et al. ....................... | 715/703 |
| 2007/0226284 A1* | 9/2007 | Hashimoto .................... | 708/200 |
| 2009/0251416 A1* | 10/2009 | Fujii et al. ..................... | 345/168 |

FOREIGN PATENT DOCUMENTS

| | | |
|---|---|---|
| CN | 101552853 A | 10/2009 |
| JP | 2001-75430 A | 3/2001 |
| JP | 2007-090757 A | 4/2004 |
| JP | 2006-015623 A | 1/2006 |
| JP | 2006-195220 A | 7/2006 |

(Continued)

OTHER PUBLICATIONS

Notice of Reasons for Rejection issued to corresponding JP Application No. 2011-166521 mailed Oct. 23, 2013.
EPO Communication—Extended European Search Report for a counter-part foreign application dated Feb. 5, 2013.

(Continued)

*Primary Examiner* — Ashish K Thomas
*Assistant Examiner* — Neil R McLean
(74) *Attorney, Agent, or Firm* — Knobbe Martens Olson & Bear LLP

(57) ABSTRACT

An operation apparatus according to the present disclosure includes a touch panel, an instruction detection unit, a different language acceptance unit, and a character string changing unit. The different language acceptance unit displays a language switching key including a character string in a different language corresponding to the first character string in the vicinity of the first character string displayed on a setting item key identified by the changing instruction thus detected, such that an input operation thereon can be accepted by the touch panel, upon detection of the changing instruction by the instruction detection unit. The character string changing unit, upon detection of an input operation to the language switching key by the touch panel, changes the language of the first character string and the second character string to character strings in a predetermined different language.

12 Claims, 12 Drawing Sheets

(56) References Cited

FOREIGN PATENT DOCUMENTS

| JP | 2006195220 A | * | 7/2006 |
| JP | 2011-061590 A | | 3/2011 |
| JP | 2011-61590 A | | 3/2011 |

OTHER PUBLICATIONS

English Machine Translation of JP 2006-195220.
Office Action mailed Jun. 27, 2014 in corresponding CN application No. 201210250167.4.

* cited by examiner

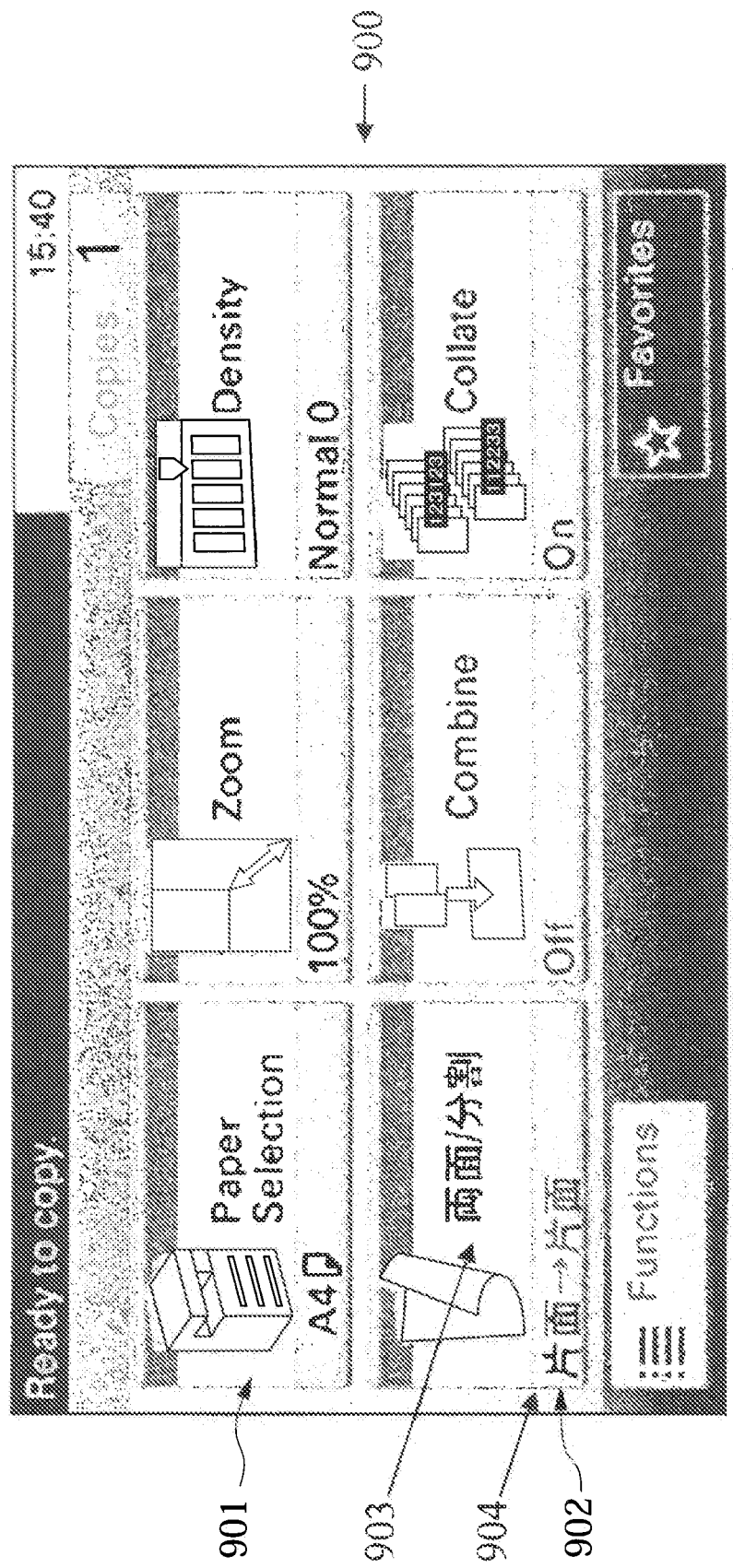

OPERATION APPARATUS, IMAGE FORMING APPARATUS, DISPLAY CONTROL METHOD, AND MEDIUM FOR RECORDING PROGRAM

INCORPORATION BY REFERENCE

This application is based on and claims the benefit of priority from Japanese Patent Application No. 2011-166521, filed on 29 Jul. 2011, the content of which is incorporated herein by reference.

BACKGROUND

The present disclosure is related to an operation apparatus, an image forming apparatus, a display control method, and a medium for recording a program.

In recent years, an image forming apparatus using xerography provides various image forming modes such as a duplex mode, an image editing mode, and the like. These image forming modes may be used in combination in such an image forming apparatus. Image forming apparatuses have become multifunctional.

As the image forming apparatus becomes multifunctional, a setting procedure of each of the image forming modes becomes complex. Given this, the image forming apparatus employs an operation panel using a display device such as an LCD (liquid crystal display). An operator-guided type operation panel is most widely used as the operation panel, that displays not only keys for setting the modes but also guidance of the setting procedure.

In general, such guidance of the setting procedure is preferably provided in a language of a country in which the apparatus is used. Meanwhile, an image forming apparatus for a multinational company and a multicultural region is provided that is configured such that an operator selects a language or the apparatus determines a language from a plurality of sets of language data installed in advance, and to switch the languages of guidance.

However, in a case in which a technology of selecting an appropriate language based on a type of paper, a source voltage, a satellite signal and the like is employed in the abovementioned image forming apparatus, the display language of the apparatus is fixed to Japanese while the apparatus is installed in Japan even if most of operators are foreign language speakers.

Here, the image forming apparatus is preferably configured such that display languages can be switched by an operator operating a key or the like. The display language is thus not fixed in the image forming apparatus. But, in this case, a language selected by an operator who used the image forming apparatus last may remain.

For example, in an environment in which most of operators use Japanese and only a part of operators use English, if an operator who operated last had selected English display, the image forming apparatus continues displaying messages in English. In this case, the image forming apparatus continues English display, regardless of the situation in which most of operators select Japanese display and use the apparatus in Japanese display. In this case, an operator who uses the image forming apparatus next likely needs to perform a language switching operation.

The same situation may occur in an image forming apparatus allowing programmed execution of a plurality of jobs, since an operator who programs the jobs and an operator who actually performs the jobs do not necessarily use the same language.

In order to solve such a problem, an image forming apparatus is disclosed as Related Art 1, the image forming apparatus including: a storage means that stores display data for displaying a predetermined window on a display device in a plurality of languages; a language switching means that allows switching between the languages of the display data to be displayed on the display device; and a default setting means that allows selection of a default language of the display data to be displayed by default on the display device. The abovementioned image forming apparatus includes an image forming operation programming means that allows programming of another image forming operation while a certain image forming operation is executed by an image forming means; and a display language switching means that displays a display window on the display device for programming of the another image forming operation during execution of the certain image forming operation after switching the language of the display data to the default language. As a result, in the abovementioned image forming apparatus, frequency of using the language switching means can be reduced and operability can be improved, for example by setting the most frequently used language as the default language.

In addition, an image forming apparatus is disclosed as Related Art 2, in which display languages of a display window (operation window) on an operation panel are switched by a plurality of language keys carrying language names. The image forming apparatus is provided with: the plurality of language keys that are activated when being pressed by a user; a pressure detection means that detects pressure on a predetermined language key by the user; and a display language switching means that switches the display language from a preset language to the language of the language key being pressed while the pressure detection means detects pressure on the predetermined language key. The image forming apparatus is thus configured to allow easy switching of the display languages by a single operation (single-step operation) by a user. In addition, the image forming apparatus is configured such that the display language is switched back to the preset language when the pressure on the language key is released. The image forming apparatus is thus configured to reduce complex operation such as setting operation of the display language.

However, in the technique disclosed in Related Art 1, all the display data (message, character string, and the like) displayed on the display window is switched to the display data translated into a predetermined language, upon execution of language switching. Generally, when a user needs language switching of the display data, it is often sufficient to translate only a part of the display data. Given this, a switching process for all the display data is uneconomical.

In addition, in the technique disclosed in Related Art 2, the display language of the entire display window (the display data) is translated into a language corresponding to the language key while the language key is pressed. In the technique disclosed in Related Art 2, the display language is switched back to the preset language when the pressure on the language key is released.

Therefore, in the technique disclosed in Related Art 2, if a user switches the display language to a predetermined language by pressing the language key, checks display contents, and then advances to a next display window, the display language is switched back to the preset language. The user is required to switch the display language again by pressing the language key. In other words, in a case of employing the technique disclosed in Related Art 2, the image forming apparatus requires a user to operate on the language key each time the display window is advanced, for inputting setting conditions for a predetermined setting item key. In the image forming apparatus, a large number of user operations may be required.

SUMMARY

An operation apparatus according to the present disclosure includes a touch panel, an instruction detection unit, a different language acceptance unit, and a character string changing unit.

The touch panel includes a display unit that can display at least a first window displaying a plurality of setting item keys on which a first character string and a second character string relating thereto are displayed, and a touch sensor that detects an input operation on each of a plurality of software keys including the plurality of setting item keys, the plurality of software keys being displayed on the display unit.

The instruction detection unit detects a changing instruction intended to change a character string displayed on a predetermined setting item key among the plurality of setting item keys to a character string in a different language, based on information relating to an input operation detected by the touch panel.

The different language acceptance unit displays a language switching key including a character string in a different language corresponding to the first character string in the vicinity of the first character string displayed on a setting item key identified by the changing instruction thus detected, such that an input operation thereon can be accepted by the touch panel, upon detection of the changing instruction by the instruction detection unit.

The character string changing unit, upon detection of an input operation to the language switching key by the touch panel, changes the language of the first character string and the second character string to character strings in a predetermined different language, based on a content of the input operation detected by the touch panel.

An image forming apparatus according to the present disclosure includes an operation apparatus.

The operation apparatus according to the present disclosure includes a touch panel, an instruction detection unit, a different language acceptance unit, and a character string changing unit.

The touch panel includes a display unit that can display at least a first window displaying a plurality of setting item keys on which a first character string and a second character string relating thereto are displayed, and a touch sensor that detects an input operation on each of a plurality of software keys including the plurality of setting item keys, the plurality of software keys being displayed on the display unit.

The instruction detection unit detects a changing instruction intended to change a character string displayed on a predetermined setting item key among the plurality of setting item keys to a character string in a different language, based on information relating to an input operation detected by the touch panel.

The different language acceptance unit displays a language switching key including a character string in a different language corresponding to the first character string in the vicinity of the first character string displayed on a setting item key identified by the changing instruction thus detected, such that an input operation thereon can be accepted by the touch panel, upon detection of the changing instruction by the instruction detection unit.

The character string changing unit, upon detection of an input operation to the language switching key by the touch panel, changes the language of the first character string and the second character string to character strings in a predetermined different language, based on a content of the input operation detected by the touch panel.

A display control method according to the present disclosure is for an operation apparatus provided with a touch panel including a display unit that can display at least a first window displaying a plurality of setting item keys on which a first character string and a second character string relating thereto are displayed, and a touch sensor that detects an input operation on each of a plurality of software keys including the plurality of setting item keys, the plurality of software keys being displayed on the display unit.

The display control method includes an instruction detection step, a different language acceptance step, and a character string changing step.

In the instruction detection step the operation apparatus detects a changing instruction intended to change a character string displayed on a predetermined setting item key among the plurality of setting item keys to a character string in a different language, based on information relating to an input operation detected by the touch panel.

In the different language acceptance step the operation apparatus displays a language switching key including a character string in a different language corresponding to the first character string in the vicinity of the first character string displayed on a setting item key identified by the changing instruction thus detected, such that an input operation thereon can be accepted by the touch panel, upon detection of the changing instruction by the instruction detection unit In the character string changing step the operation apparatus, upon detection of an input operation to the language switching key by the touch panel, changes the language of the first character string and the second character string to character strings in a predetermined different language, based on a content of the input operation detected by the touch panel.

A storage medium according to the present disclosure is a computer-readable storage medium that stores a program that causes a computer to execute the display control method.

BRIEF DESCRIPTION OF THE DRAWINGS

FIG. 9A is a third diagram showing an example of the initial window displayed on the touch panel.

DETAILED DESCRIPTION

An embodiment of an image forming apparatus provided with the operation device of the present disclosure is described hereinafter with reference to the accompanying drawings for better understanding of the present disclosure. It should be noted that the following embodiments are mere examples of implementation of the present disclosure, and in no way restrict the technical scope of the present disclosure. Moreover, a prefix "S" attached to numbers in flow charts unit "step".

Image Forming Apparatus and Operation Apparatus

Hereafter, an image forming apparatus provided with an operation apparatus according to an embodiment of the present disclosure will be described.

Figure 1:
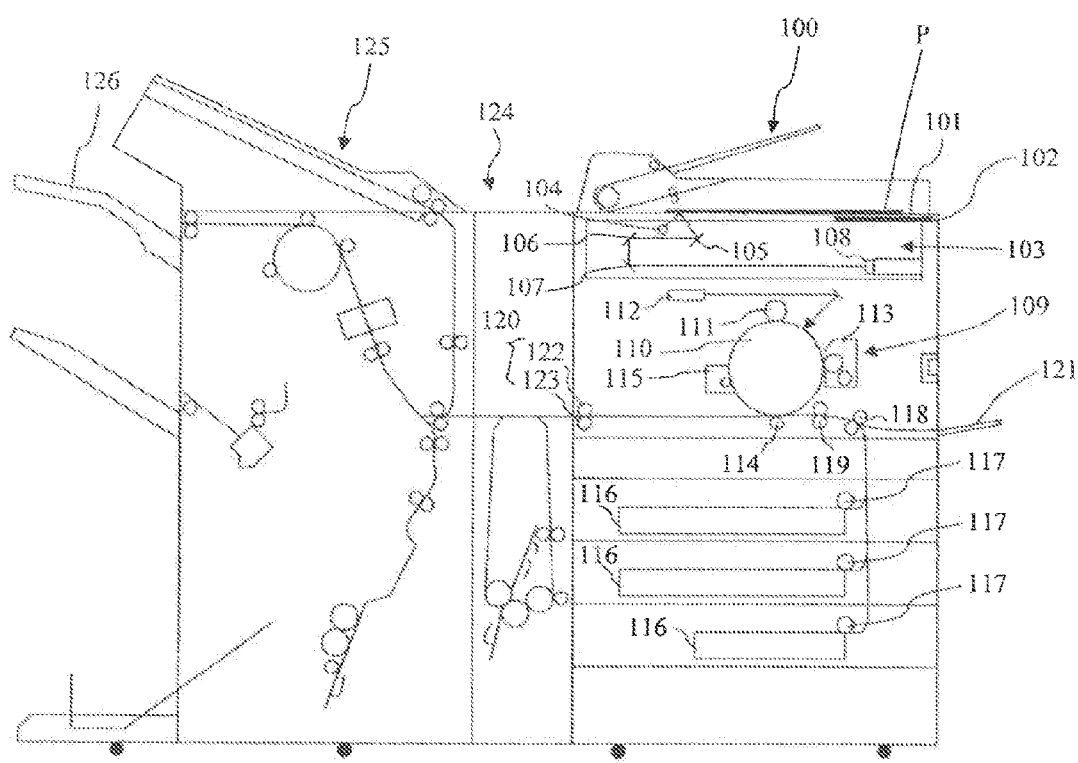
FIG. 1 is a conceptual diagram showing an overall configuration of the inside of a multifunction peripheral.

FIG. 1 is a schematic view of an image forming apparatus according to the embodiment of the present disclosure. However, the details of each component not directly related to the present disclosure are omitted. The image forming apparatus according to the present disclosure is a multifunction peripheral or the like that includes for example, a printer or a scanner unit, or a printer, a copying machine, a scanner, a FAX, or the like, which functions as an image forming apparatus including a copy function, a scanner function, a facsimile function, a printer function and the like. Operation of a multi function peripheral 100 (MFP: Multi Function Peripheral) in the case in which using copy function, for example, will be described briefly below.

First, when using the multifunction peripheral 100, the user places an original P on a platen 101 arranged at a top face of the multifunction peripheral 100, and inputs setting conditions of a copy function from an operation unit 102. On the operation unit 102 (operation apparatus), an operation window (initial window (first window) and the like) relating to the copy function provided by the multifunction peripheral 100 such that a plurality of setting item keys relating to the copy function can be selected.

The operation unit 102 is configured to display at least a first window displaying a plurality of setting item keys on which a first character string and a second character string relating thereto are displayed. In addition, the operation unit 102 detects an input operation on each of the plurality of software keys including the plurality of setting item keys.

In the operation window, function item keys for various functions are selectable displayed in tabs. A user inputs a setting condition relating to the copy function from the operation window.

After completing the input of the setting condition, the user makes the multifunction peripheral 100 start the process of the copy function by pressing a START key (described later) provided in the operation unit 102.

When the multifunction peripheral 100 starts the process of copy function, an image reader 103 irradiates light from a light source 104 onto the original placed on the platen 101. Then, the light reflected from the original is guided to an imaging device 108 by mirrors 105, 106, and 107. The imaging device 108 performs photoelectric conversion of the guided light and outputs the resultant as an electrical signal. Then, a processing circuit (not illustrated) performs a fundamental correction process, image quality process, compression process, and the like, and generates an image data corresponding to the image formed on the surface of the original.

The image forming unit 109 is a driving unit that transfers the image data as a toner image. The above image forming unit 109 is provided with a photoreceptor drum 110. The photoreceptor drum 110 rotates in a predetermined direction at a constant speed. In the periphery of the photoreceptor drum 110, a charging device 111, an exposure unit 112, a developing device 113, a transfer device 114, a cleaning unit 115 and the like are disposed, in this order from an upstream side in a rotational direction.

The charging device 111 uniformly charges a surface of the photoreceptor drum 110. The exposure unit 112 irradiates a surface of the photoreceptor drum 110 thus charged with laser based on the image data, thereby forming an electrostatic latent image. The developing device 113 deposits toner on the electrostatic latent image being fed, thereby forming a toner image on the surface of the photoreceptor drum 110. The transfer device 114 transfers the toner image thus formed to a recording medium (for example, a sheet). The cleaning unit 115 removes excessive toner remaining on the surface of the photoreceptor drum 110. This series of processes is performed by rotation of the photoreceptor drum 110.

The sheet is fed from a plurality of paper feeding cassettes 116 provided in the multifunction peripheral 100. The sheet to be fed is pulled out from any one of the paper feeding cassettes 116 to a paper path by a pickup roller 117. In each of the paper feeding cassettes 116, sheets of different types are stored. The sheets are fed based on setting regarding the output conditions.

The sheet being pulled out to the paper path is fed into between the photoreceptor drum 110 and the transfer device 114 by a feeding roller 118 and a resist roller 119. The sheet thus fed is, after transfer of the toner image thereto by the transfer device 114, further fed to the fusing device 120. The sheet fed by the feeding roller 118 may also be fed from a manual feeding tray 121 provided in the multifunction peripheral 100.

When the sheet to which the toner image is transferred passes between a heating roller 122 and a pressurizing roller 123 provided in the fusing device 120, heat and pressure are applied to the toner image, thereby fusing the toner image (visible image) onto the sheet. Heat quantity of the heating roller 122 is optimized according to types of sheets, in order to appropriately realize the fusing. The image formation is completed with fusing of the toner image onto a sheet. The sheet onto which the toner image (visible image) is fused is fed to the folding device 124 via the fusing device 120.

The sheet thus fed is subjected to a folding process in the folding device 124, according to the setting conditions input by the user. In a case in which the folding process is not input, the sheet simply passes through the folding device 124. In addition, in a case in which post-processing (for example, stapling, punching, binding and the like) is input as the setting condition by the user, the sheet having passed through the folding device 124 is fed to the binding device 125 for post-processing and stored in an ejected paper tray 126.

By the above described steps, the multifunction peripheral 100 provides the copy function to a user.

Figure 2:
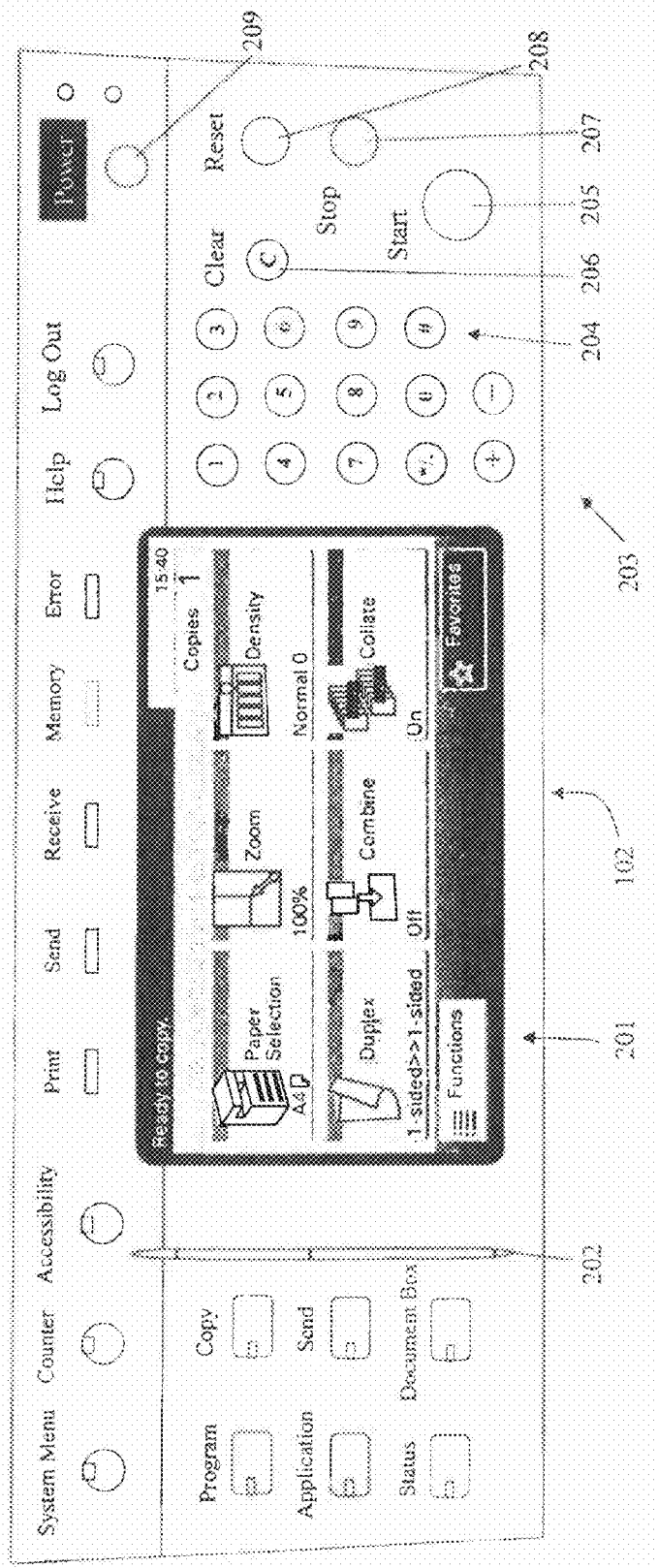
FIG. 2 is a conceptual diagram showing an overall configuration of an operation unit.

FIG. 2 is a conceptual diagram showing an overall configuration of the operation unit according to the present embodiment;

A user inputs setting conditions or the like and confirms the setting conditions being input in relation to image formation as described above by use of the operation unit 102. When the setting conditions are input, the touch panel 201 (operation panel) provided in the operation unit 102, a stylus pen 202, and the operation key 203 are used.

The touch panel 201 is provided with both a function of inputting the setting conditions (touch sensor 201b) and a function of displaying the setting conditions (display unit 201a). In other words, in the multifunction peripheral 100 (operation unit 102), by pressing a key (for example, a setting item key corresponding to a function, a selecting item key corresponding to a setting condition of the setting item and the like) in a window displayed on the touch panel 201, a setting condition corresponding to an item key being pressed can be input.

The touch panel 201 is configured to display at least a first window that displays the plurality of setting item keys on which the first character string and the second character string relating thereto are displayed. The touch panel 201 is configured to display also a setting condition input window 800 on which a third character string is displayed.

The touch panel 201 is configured to detect an input operation on each of the plurality of software keys including the plurality of setting item keys displayed on the display unit. The touch panel 201 is configured to detect also an input operation on the setting condition input window 800.

In the present embodiment, the touch sensor 201b is an analog resistive film type.

The touch sensor 201b has a structure in which an upper film having translucency and a lower glass substrate are piled up via a spacer.

On facing surfaces of the upper film and the lower glass base plate, a transparent electrode layer composed of ITO (Indium Tin Oxide) and the like is provided.

The touch sensor 201b is composed such that, upon pressing of the upper film by a user, the transparent electrode layer on the upper film side and the transparent electrode layer on the lower glass base plate side contact each other at a position corresponding to a pressed position (user-indicated position, contacted position, contacted area).

The touch sensor 201b applies a voltage to the upper film or the lower glass base plate, and extracts a voltage value corresponding to the depression position from the lower glass base plate or the upper film to thereby detect a coordinate position (depression position) corresponding to the voltage value.

Furthermore, a display unit 201a such as an LCD (liquid crystal display) or the like is provided below the lower glass base plate.

Furthermore, a stylus pen 202 is provided in the vicinity of the touch panel 201.

When the user makes a tip of the touch pen 202 contact on the touch panel 201 (touch sensor 201b), the touch panel 201 detects coordinate values corresponding to the contacted location (pressed location).

In a case in which a software key corresponding to (overlapping) the coordinate values thus detected is present (displayed), the touch panel 201 detects an operation (selection) on the software key.

In other words, the user can make an input operation (selection) on a predetermined software key by a stylus pen 202 among the plurality of software keys that is displayed.

Furthermore, in the vicinity of the touch panel 201, a predetermined number of operation keys 203 is provided, including, for example, numerical keys 204, a START key 205, a CLEAR key 206, a STOP key 207, a RESET key 208, and a POWER key 209.

Figure 3:
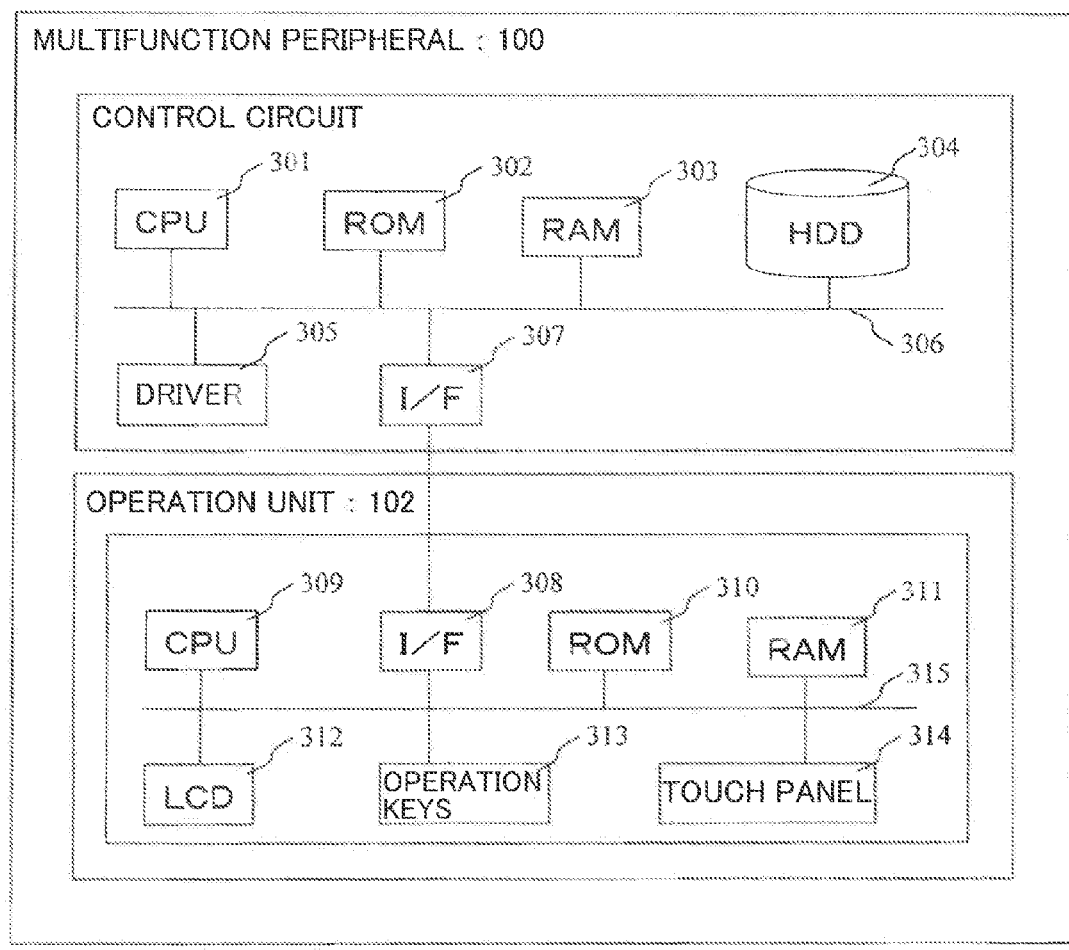
FIG. 3 is a diagram showing a configuration of control hardware of the multifunction peripheral and the operation unit.

Next, a hardware configuration of a control system of the multifunction peripheral 100 and the operation unit 102 is described with reference to FIG. 3. FIG. 3 is a diagram showing a configuration of control hardware of the multifunction peripheral 100 and the operation unit 102. However, the details of each component not directly related to the present disclosure are omitted.

A control circuit of the multifunction peripheral 100 is configured such that a CPU (Central Processing Unit) 301, ROM (Read Only Memory) 302, RAM (Random Access Memory) 303, a HDD (Hard Disk Drive) 304, and drivers 305 respectively corresponding to the driving units are connected via an internal bus 306. The CPU 301 uses the RAM 303 as workspace, for example, and executes programs stored in the ROM 302, HDD 304, or the like, and sends and receives data and instructions from the driver 305 and the operation unit 102 (not illustrated) based on the execution result to control the operation of the driving units shown in FIG. 1. Each unit (illustrated in FIG. 4) described hereafter other than the drive units above is operated by execution of programs by the CPU 301.

In addition, an internal interface 307 is also connected to the internal bus 306 of the control circuit, and the internal interface 307 connects the control circuit of the operation unit 102, and the like to the control circuit of the multifunction peripheral 100. The CPU 301 may receive command signals from the control circuit of the operation unit 102 or the like through the internal interface 307, and may transmit command signals, data, or the like to the control circuit of the operation unit 102 or the like.

In addition, the control circuit of the operation unit 102 is configured by connecting a CPU 309, a ROM 310, a RAM 311, an LCD 312, operation keys 313 (203), a touch panel 314 (201), and an internal interface 308 together with an internal bus 315. When the user operates the operation keys 313 or the touch panel 314, the CPU 309 transmits command signals based on the operation to the control circuit of the multifunction peripheral 100 through the internal interface 308. The function of the CPU 309, the ROM 310, and the RAM 311 is the same as the above, and each unit described below (illustrated in FIG. 4) is realized by execution of programs by the CPU 309. The programs or data for realization of each unit described below are stored in the ROM 310.

Embodiment of the Present Disclosure

Figure 4:
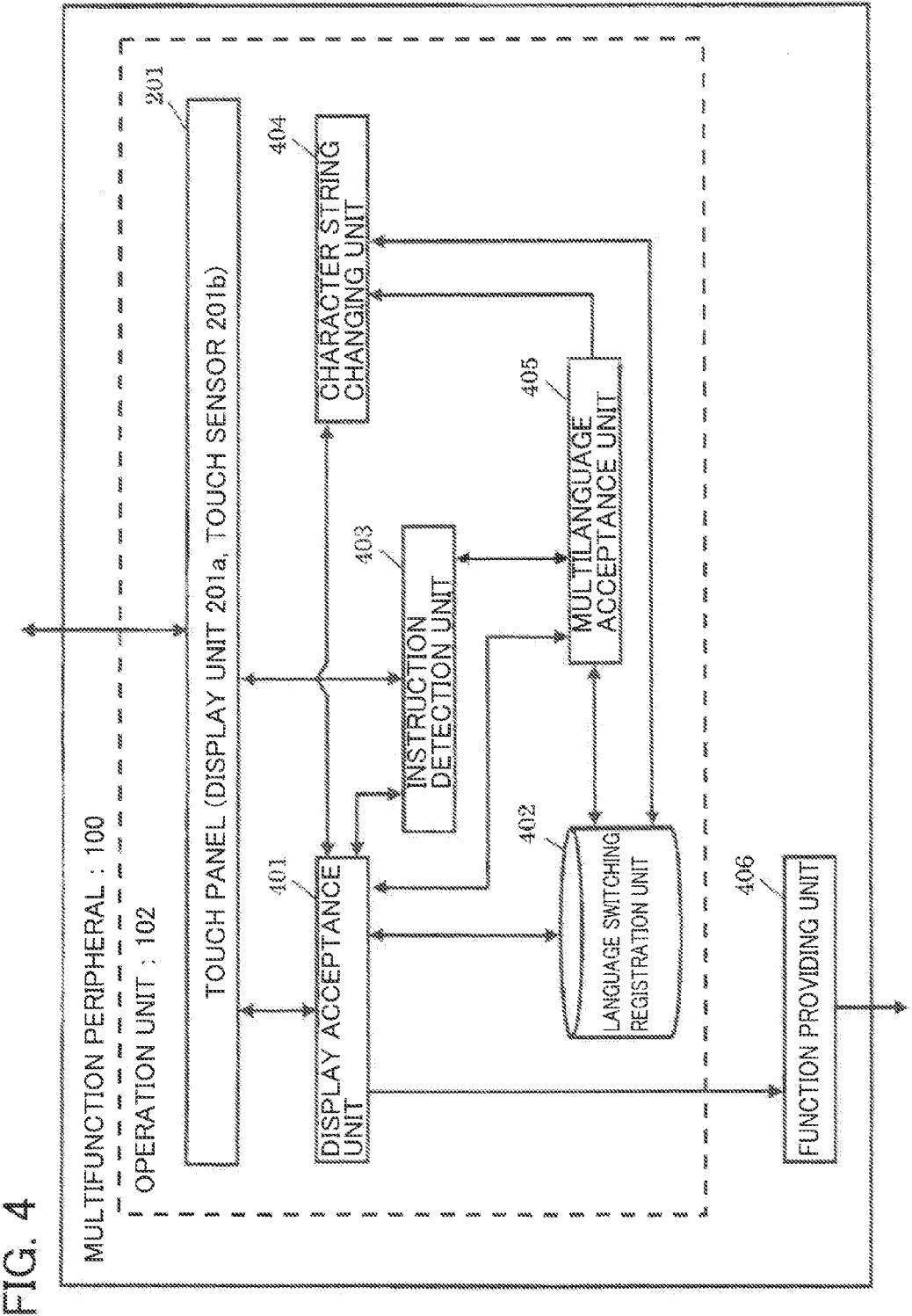
FIG. 4 is a functional block diagram of the multifunction peripheral and the operation unit.
Figure 5:
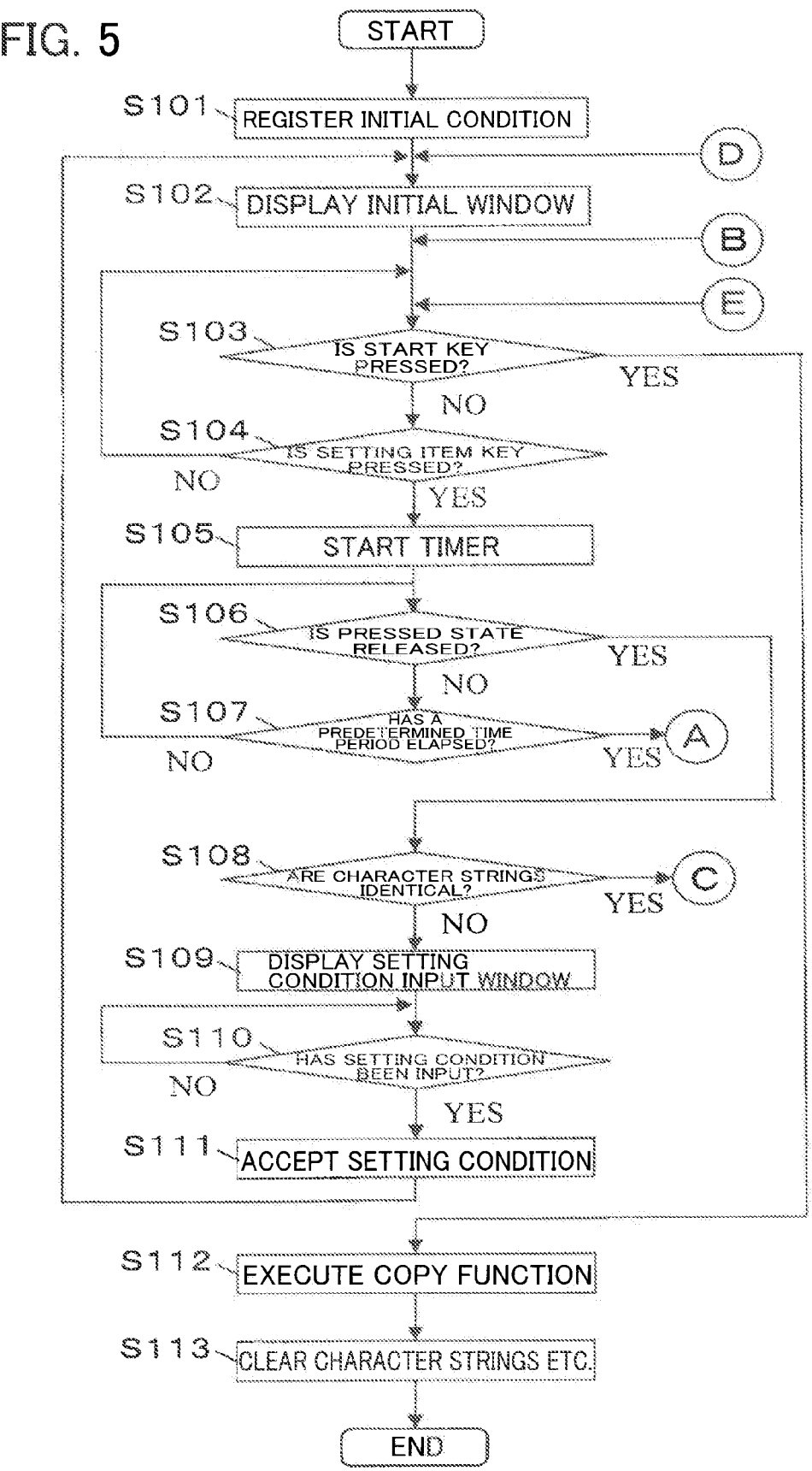
FIG. 5 is a first flowchart showing an execution procedure according to an embodiment.

Next, configurations and execution procedures according to the present embodiment will be described with reference to FIGS. 4 to 6B. FIG. 4 is a functional block diagram of the multifunction peripheral and the operation unit. FIGS. 5 and 6B are flowcharts showing the execution procedures.

First, when a user turns on the multifunction peripheral 100, the operation unit 102 is activated upon activation of the multifunction peripheral 100. Thereafter, a display acceptance unit 401 of the operation unit 102 obtains initial setting conditions stored in advance in predetermined initial setting condition memory, and stores temporarily the initial setting conditions in predetermined setting condition memory as setting conditions (FIG. 5: Step S101). Here, the initial setting conditions are initial conditions for each setting item composing the setting conditions for a function (for example, copy function) provided by the multifunction peripheral 100.

Next, the display acceptance unit 401 obtains a language name of an initial language stored in advance in predetermined language setting memory (for example, "English") and refers to a language switching table 700 in a language switching registration unit 402.

Figure 7A:
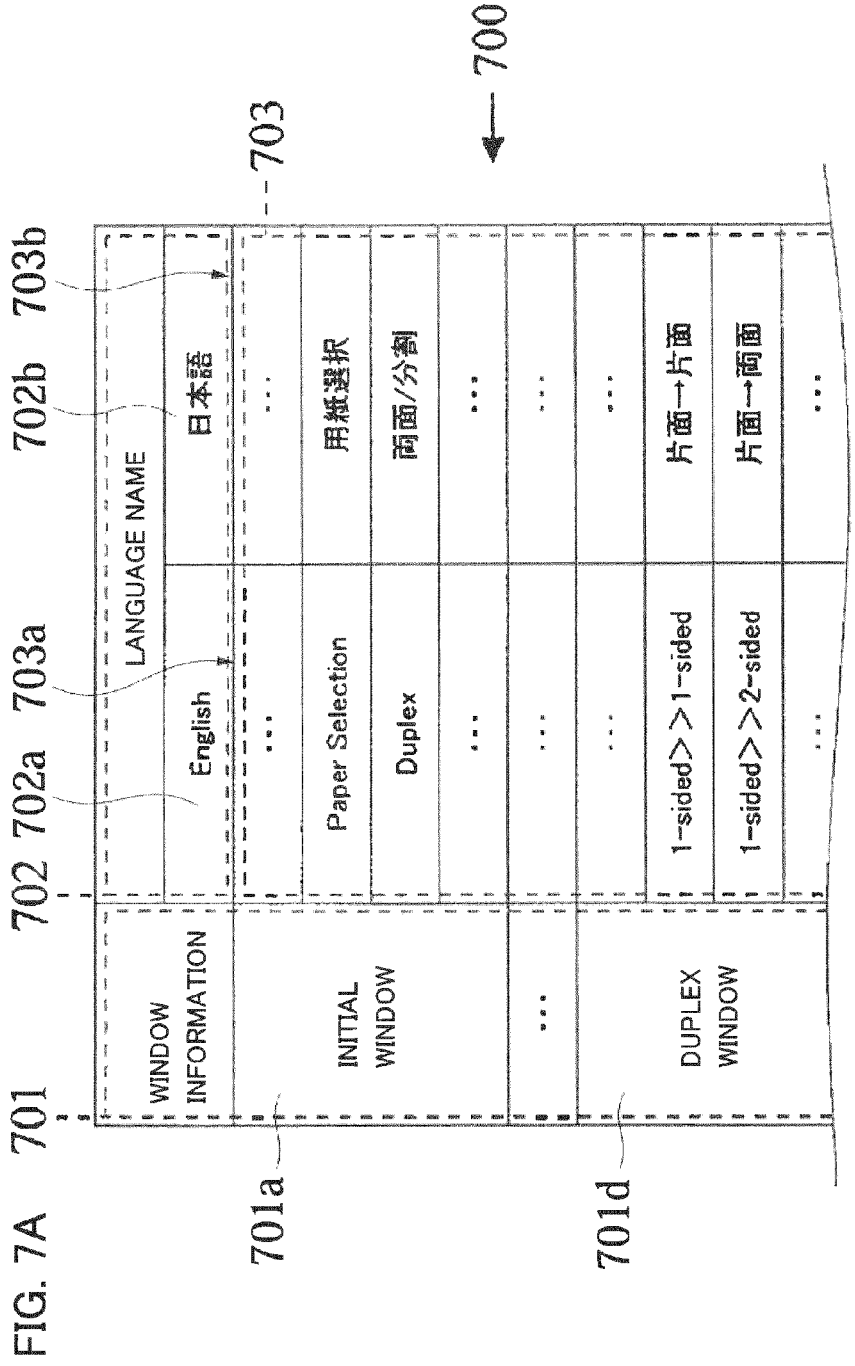
FIG. 7A is a diagram showing an example of a language switching table.

The language switching table 700 stores: window information 701 for identifying a certain operation window (for example, "initial window" for identifying the initial window); a language name 702 which represents a language of a character string displayed in a character display region on a key (key region, button region and the like) in the operation window identified by the window information 701 (for example, "English" "日本語" and the like); and a character string 703 translated into the language represented by the language name 702 (for example, "Duplex", "両面/分割" and the like) are stored in association with each other, as shown in FIG. 7A.

Here, the window information 701 in the language switching table 700 is configured such that a character string 703a translated into a language of a first language name 702a and a character string 703b translated into a language represented by a second language name 702b are of the same meaning.

For example, in the window information 701 "initial window", the character string 703a "Duplex" corresponding to the language name 702a "English" and the character string 703b "両面/分割" corresponding to the language name 702b "日本語" are of the same meaning.

In addition, as the window information 701, in addition to window information 701a corresponding to "initial window", window information for identifying a setting value input window in which setting conditions for a certain setting item key can be input when the setting item key is pressed (for example, window information 701d of "Duplex Window" corresponding to the setting condition input window of the setting item key "Duplex").

As the character string 703 corresponding to "Duplex Window" 701d as the window information 701, the character string 703 (for example, "1-sided>>1-sided") displayed in a character display region of a key relating to the setting item key of the "Duplex Window". The "key relating to the setting item key" includes, for example, a selecting item key for reflecting a predetermined setting condition.

After referring to the language switching table 700, the display acceptance unit 401 obtains the character string 703a ("Paper Selection", "Duplex" and the like) that corresponds to "initial window" 701a as the window information 701 and corresponds to the language name "English" 702a as the initial language previously obtained, for displaying the initial window. And then, the display acceptance unit 401 displays the character string 703a thus obtained and the initial window corresponding to the setting condition on the touch panel 201 (FIG. 5: S102).

On the initial window 704 (first window), a plurality of setting item keys 706 is displayed. The touch panel 201 displays the initial window 704 such that an input operation on each of the plurality of setting item keys 706 can be detected.

Each of the plurality of setting item keys 706 includes a first character string 705 and a second character string 707 relating to the first character string 705.

Figure 7B:
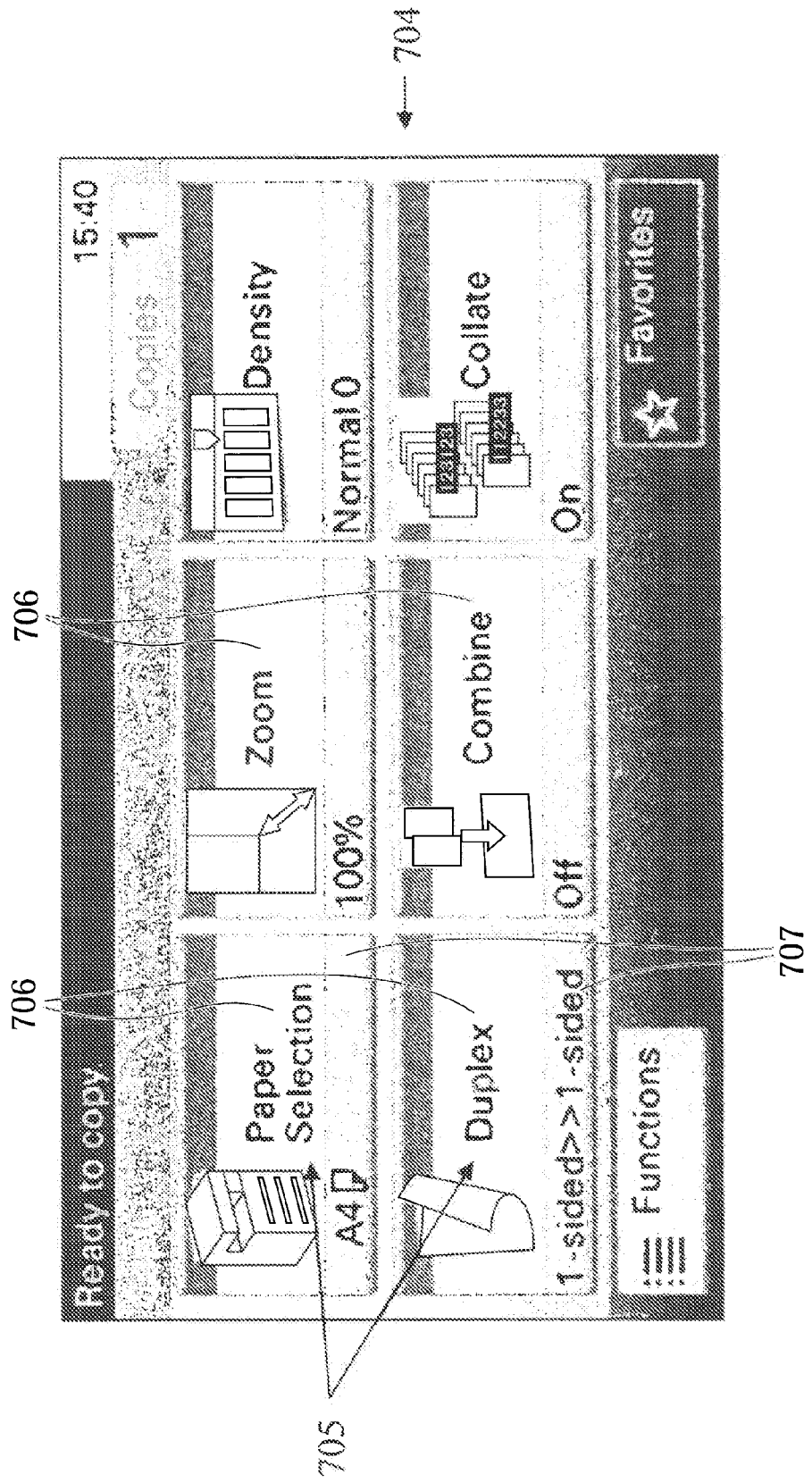
FIG. 7B is a first diagram showing an example of an initial window (first window) displayed on a touch panel.

In the initial window 704, each of the plurality of setting item keys 706 includes a plurality of the first character strings 705 ("Paper Selection", "Duplex" and the like) displayed in the initial language "English" in a predetermined character display region, as shown in FIG. 7B. As described above, on the touch pane 201, the plurality of setting item keys 706 is displayed such that pressure (input operation) thereon can be detected.

In addition, on the initial window 704, each of the plurality of setting item keys 706 includes the second character string 707 relating to the first character string 705.

If a user looking at the initial window 704 presses a predetermined setting item key 706 (for example, "Duplex" key) (FIG. 5: Step S104YES) without pressing the START key 205 (FIG. 5: Step S103NO), an instruction detection unit 403 accepts pressure (input operation) on the "Duplex" key based on detection information provided by the touch panel 201. And then, the instruction detection unit 403 starts detecting a changing instruction (more specifically, an instruction signal or a changing signal) with respect to the character string "Duplex" of the "Duplex" key, intended to change the character string to a character string in a different language.

The instruction detection unit 403 detects the changing instruction intended to change a character string displayed on a predetermined setting item key 706 among the plurality of setting item keys 706 to a character string in a different language, based on information relating to an input operation detected by the touch panel 201.

The instruction detection unit 403 detects the changing instruction in a case of detecting an input operation on a predetermined setting item key continuing for a predetermined period of time.

More specifically, first, the instruction detection unit 403 accepts information from the touch panel 201 indicating that the "Duplex" key is pressed (that an input operation is detected) (FIG. 5: Step S104YES), and times an elapsed time since the beginning of pressure (input operation) on the "Duplex" key by obtaining time information from a predetermined timer provided in advance (FIG. 5: Step S105).

The instruction detection unit 403 then checks whether a pressed state (input operation is detected) of the "Duplex" key is terminated or not, at predetermined time intervals based on the detection information provided by the touch panel 201 (Step S206).

In a case in which it is determined that the pressed state (input operation is detected) is not terminated (continuing) (Step S106NO), the instruction detection unit 403 compares the elapsed time thus timed with a predetermined preset time period (for example, 2 seconds) and determines whether the elapsed time exceeds the predetermined time period (Step S107). The instruction detection unit 403 detects whether the pressure on the "Duplex" key continues (continuously pressed) until the elapsed time exceeds the predetermined time (FIG. 5: Steps S106, S107).

Here, in a case in which the pressure (input operation) on the "Duplex" key is terminated within the predetermined time period, in other words if the pressure on the "Duplex" key does not continue (FIG. 5: Step S106YES), the instruction detection unit 403 detects that the "Duplex" key is simply pressed (input operation, selection operation) and notifies the display acceptance unit 401 of the operation.

In response to the notification, the display acceptance unit 401 accepts the pressure (input operation) on the "Duplex" key and notifies a character string changing unit 404 of the acceptance.

In response to the notification, the character string changing unit 404 refers to predetermined character string changing memory and determines whether the character string "Duplex" of the "Duplex" key is identical to the character string stored in the character string changing memory (FIG. 5: Step S108).

Here, since nothing is stored in the character string changing memory, the character string changing unit 404 determines that the two character strings are not identical (FIG. 5: Step S108NO) and notifies the display acceptance unit 401 of the determination.

In response to the notification, the display acceptance unit 401 refers to the language switching table 700 and obtains, from the language switching table 700, the character string 703a (for example, "1-sided>>1-sided", "1-sided>>2-sided", and the like) that corresponds to the window information 701d "Duplex Window" identifying the setting condition input window of the "Duplex" key and corresponds to the language name 702a "English" as the initial language.

Thereafter, the display acceptance unit 401 displays the setting condition input window including the character string 703a thus obtained, on which the setting condition of the setting item corresponding to the setting item key can be input, on the touch panel 201 (FIG. 5: Step S109).

Figure 8A:
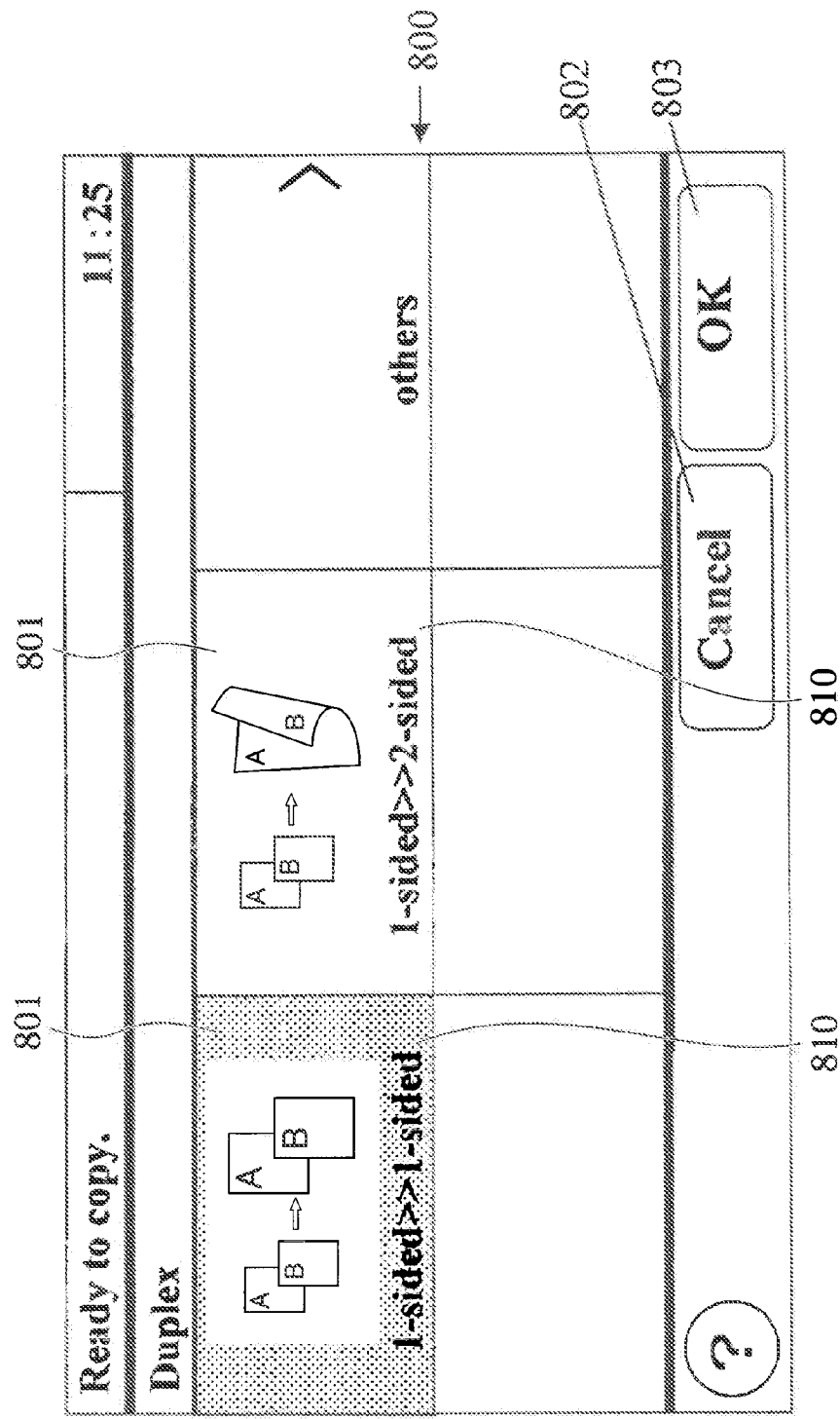
FIG. 8A is a diagram showing an example of a setting condition input window displayed on the touch panel.

On the setting condition input window 800, a plurality of selecting item keys 801 (for example, "1-sided>>1-sided" key and the like), the CANCEL key 802, and the OK key 803 are displayed, as shown in FIG. 8A. The touch panel 201 displays the setting condition input window 800 such that an input operation on the plurality of selecting item keys 801, the CANCEL key 802 and the OK key 803 can be detected.

Each of the plurality of selecting item keys 801 includes a third character string 810 expressed in the initial language (English).

A case in which the two character strings are identical (FIG. 5: Step S108YES) will be described later.

When a user looking at the setting condition input window 800 presses the predetermined selecting item key 801 (for example, "1-sided>>2-sided") and then the OK key 803 (FIG. 5: Step S110YES), the display acceptance unit 401 accepts pressure (input operation) of the "1-sided>>2-sided" key, based on detection information provided by the touch panel 201. The display acceptance unit 401 then changes, among the setting conditions in the setting condition memory, the setting condition for the "Duplex" (setting condition corresponding to the initial value "1-sided>>1-sided", for example "0") to the setting condition corresponding to "1-sided>>2-sided" (for example, "1") (FIG. 5: Step S111). Input of the setting condition for the predetermined setting item is thus completed.

Next, returning to Step S102, the display acceptance unit 401 displays the initial window reflecting the setting condition after change on the touch panel 201 (FIG. 5: S102).

The above description applies to a general case of pressing the setting item key 706, in which the user can understand meaning of the character string of the setting item key 706 and meaning of the character string on the selecting item key 801 on the setting condition input window 800.

On the other hand, in Step S104, if the user presses the "Duplex" key among the setting item keys 706 on the initial window 704 for a predetermined period of time, not being able to understand the meaning of the character string "Duplex" on the "Duplex" key, the following procedure takes place.

More specifically, when the user presses the "Duplex" key (FIG. 5: Step S104YES), the instruction detection unit 403 times the elapsed time since the beginning of pressure (input operation) on the "Duplex" key (FIG. 5: Step S105). And then, if the user continues pressing the "Duplex" key (FIG. 5: Step S106NO) and the elapsed time exceeds the predetermined time period (FIG. 5: Step S107YES), the instruction detection unit 403 detects that a changing instruction intended to change the character string "Duplex" on the "Duplex" key to a character string expressed in a different language is input by the user's operation, and notifies the different language acceptance unit 405 of the detection.

Figure 6A:
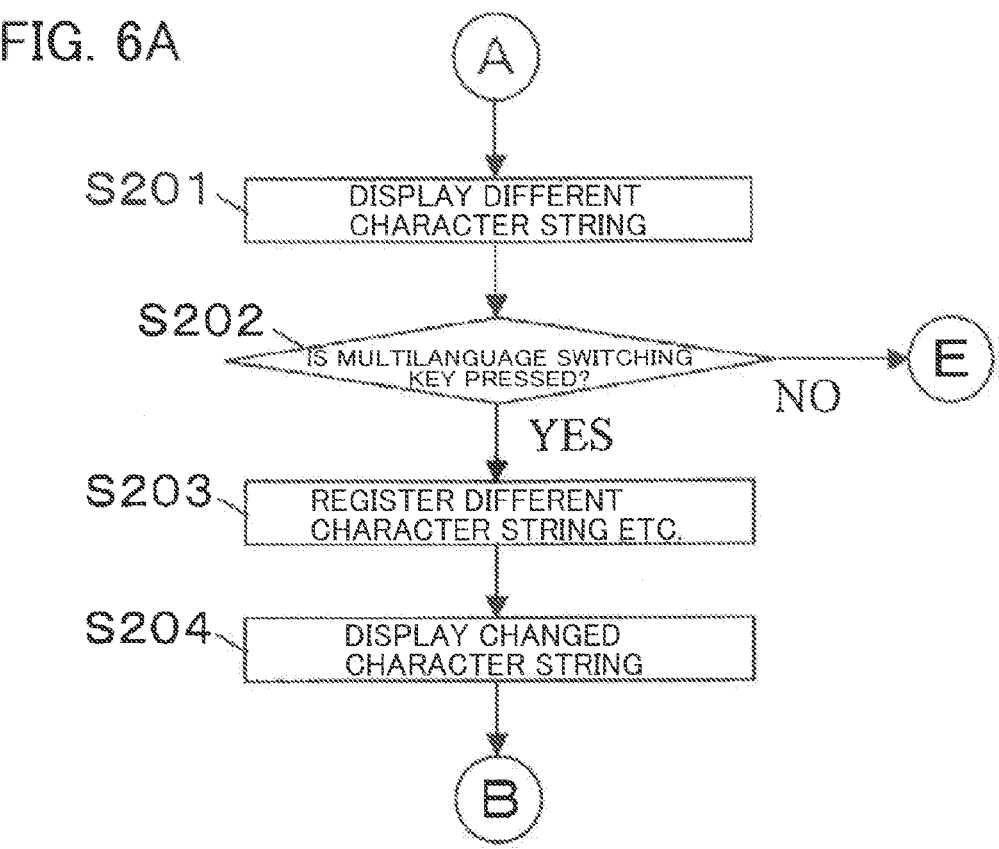
FIG. 6A is a second flowchart showing an execution procedure according to the embodiment.
Figure 6B:
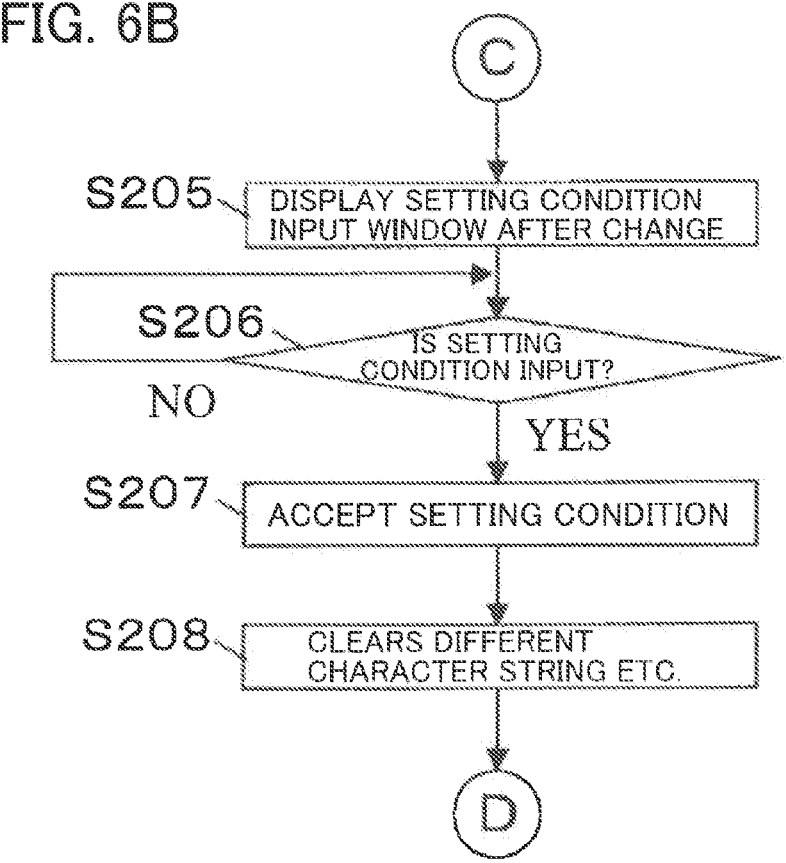
FIG. 6B is a second flowchart showing an execution procedure according to the embodiment.

In response to the notification, the different language acceptance unit 405 displays a language switching key 820 including the character string 806 in a language different from the language of the first character string 807 in the vicinity of the first character string 807 on the "Duplex" key identified by the changing instruction, such that an input operation thereon can be accepted by the touch panel 201 (FIG. 6A: Step S201).

The different language acceptance unit 405 displays a language switching key including a character string in the different language corresponding to the first character string in the vicinity of the first character string displayed on the setting item key identified by the changing instruction thus detected, such that an input operation thereon can be accepted by the touch panel, upon detection of the changing instruction by the instruction detection unit 403.

As described later, the different language acceptance unit 405 can be configured to display the language switching key in a form of a pull-down list.

More specifically, the different language acceptance unit 405 refers to the language switching table 700, and obtains therefrom, information of the character string ("両面/分割") corresponding to the character string "Duplex" on the "Duplex" key, that is translated into the different language ("日本語" (Japanese)) from the language of the character string "Duplex" ("English"). And then, the different language acceptance unit 405 displays, based on the information obtained, the language switching key 820 including the character string "両面/分割" 807 in the vicinity of the character string 806 on the "Duplex" key in the initial window, such that an input operation thereon can be accepted by the touch panel 201.

Figure 8B:
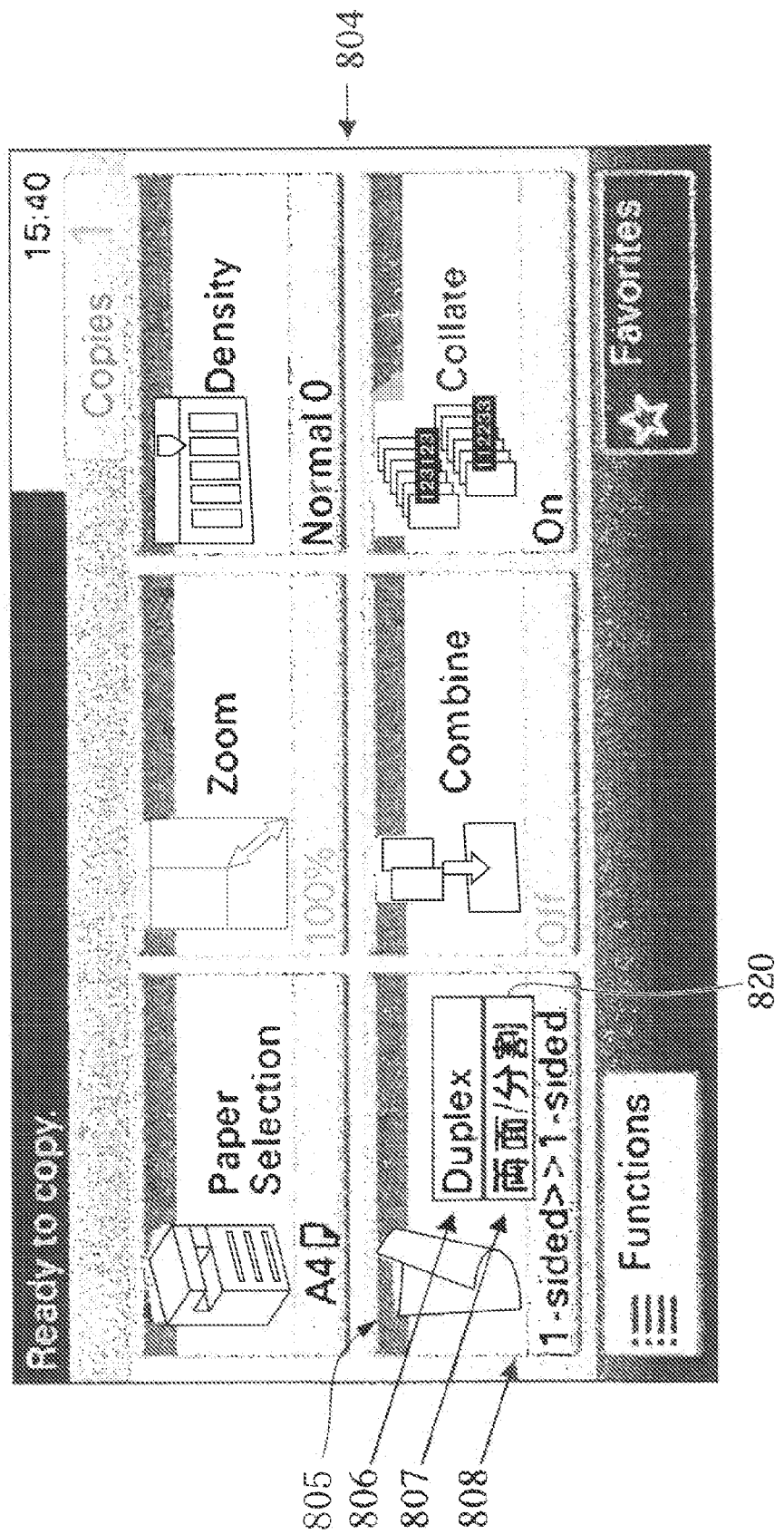
FIG. 8B is a second diagram showing an example of the initial window displayed on the touch panel.

In the initial window 804, as shown in FIG. 8B, the language switching key 820 including the character string 807 ("両面/分割") displayed in the different language ("日本語" (Japanese)) is displayed below the third character string 806 ("Duplex") of the "Duplex" key 805 in a form of a pull-down list, such that pressure (input operation) thereof can be detected by the touch panel 201.

The multifunction peripheral 100 (operation unit 102) is thus configured to, even in a case in which the user cannot understand the meaning of the character string 806 of the setting item key 805 expressed in an unknown language, display the character string 807 expressed in the different language by accepting the operation from the user as described above. The character string 807 can thus be displayed in a language familiar to the user, allowing the user to understand the content thereof at first glance.

In addition, since the character string 807 being displayed has the same meaning as the character string 806 on the setting item key 805, the multifunction peripheral 100 is configured such that the user can understand the content of the setting item key 805 at first glance.

It should be noted that, although only one character string 807 in a different language is displayed in FIG. 8B, the present disclosure is not limited thereto and a plurality of character strings in different languages can be displayed. In a case in which a plurality of character strings 807 is stored in the language switching table 700, for example in a case in which the character string 807 in Chinese ("双工/分流") as well as Japanese, the different language switching key 820 in which the plurality of character strings 807 ("両面/分割" and "双工/分流") is displayed in a form of a pull-down list is displayed immediately below the character string 806 such that pressure (input operation) thereon can be detected by the touch panel 201.

In Step S202, when the user looking at the initial window 804 presses (input operation, selection) the character string 807 "両面/分割", which is displayed on the different language switching key 820 in a familiar language (FIG. 6A: Step S202YES), the different language acceptance unit 405 accepts the selection of the character string in the language on the different language switching key 820 based on a result of detection by the touch panel 201, and notifies the character string changing unit 404 of the acceptance.

In response to the notification, the character string changing unit 404 changes the first character string of the corresponding setting item key and the second character string relating to the setting item key to character strings expressed in the language of the character string (key of character string "両面/分割") selected in the different language switching key.

The character string changing unit 404, upon detection of an input operation to the language switching key by the touch panel 201, changes the language of the first character string and the second character string to character strings in a predetermined different language, based on a content of the input operation detected by the touch panel 201. The character string changing unit 404 changes the first character string and the second character string included in the setting item key to character strings expressed in the same language as the character string selected in the different language switching key.

When a setting condition input window allowing input of a setting item corresponding to the setting item key in which the language of the first character string and the second character string is changed to a different language is displayed on the touch panel, the character string changing unit 404 displays a third character string, which is displayed on the setting condition input window, after changing the language thereof to the same language as the first character string and the second character string. In a case in which the first character string and the second character string are changed to character strings in a different language, the character string changing unit 404 displays the third character string after changing to a character string in the different language.

More specifically, the character string changing unit 404 temporarily stores information of the character string " 両面/分 割 " and information of the language name " 日本語 " of the character string, to the character string changing memory (FIG. 6A: Step S203).

Next, the character string changing unit 404 searches for the first character string of the setting item key corresponding to the character string 807 " 両面/分割 " and the second character string relating to the setting item key, based on information of the initial window 804 currently displayed on the touch panel 201.

For example, if the first character string 807 is " 両面/分割 ", as shown in FIG. 8B, the first character string 806 of the corresponding setting item key 805 is "Duplex"; and the second character string 808 relating to the setting item key 805 is "1-sided>>1-sided" corresponding to the current setting condition of the setting item key.

And then, the character string changing unit 404 refers to the language switching table 700 and obtains, from the language switching table 700, information of a character strings 703b (" 両面/分割 " and " 片面→片面 ") corresponding to the character strings thus found ("Duplex" and "1-sided>>1-sided") and corresponding to the language name " 日本語 " (language name 702b) stored in the character string changing memory. In addition, the character string changing unit 404 displays the character string used for search, in the initial window 804, after changing to the character strings thus obtained (FIG. 6A: Step S204).

In the initial window 900 in which a certain character string is changed, character strings of the setting item keys 901 not being pressed (input operation, selection) by the user are not changed, as shown in FIG. 9A. In addition, in the initial window 900, the first character string 903 of the setting item key 902 (the setting item key with character string in a changed language) being pressed (input operation, selection) by the user; and the second character string 904 relating to the setting item key (first character string) are displayed in the different language instructed by the user.

As a result, the multifunction peripheral 100 (operation unit 102) is configured to comprehensibly display, not only the contents of the setting item key 902 in an unfamiliar language to the user, but also the contents of a character string relating thereto. The multifunction peripheral 100 (operation unit 102) is thus configured such that the user can correctly understand the contents of the setting item key 902 and setting conditions relating thereto such as setting conditions being currently set.

Then, the processing is advanced from Step S204 to Step S103. If the user looking at the initial window 900 presses the setting item key 902 on which " 両面/分割 " is displayed (FIG. 5: Step S104YES) without pressing the START key (FIG. 5: Step S103NO), the instruction detection unit 403 accepts the pressure (input operation) on the setting item key 902 based on detection information provided by the touch panel 201, and, as in the abovementioned case, detects whether pressure (input operation) on the setting item key 902 continues or not (FIG. 5: Step S106).

Here, if the user releases the pressure on the setting item key 902 immediately without continuously pressing the setting item key 902 (FIG. 5: Step S106YES), the instruction detection unit 403 detects that the setting item key is simply pressed (input operation). And then, the display acceptance unit 401 accepts the pressure (brief pressure, brief input operation) on the setting item key 902, and notifies the character string changing unit 404 of the acceptance.

In response to the notification, the character string changing unit 404 determines whether the character string " 両面/ 分割 " included in the setting item key is identical to the character string (" 両面/分割 ") stored in the character string changing memory (FIG. 5: S108).

Here, the character string " 両面/分割 " is already stored in the character string changing memory. Given this, the character string changing unit 404 determines that two character strings are identical (FIG. 5: Step S108YES), and refers to the language switching table 700. Thereafter, the character string changing unit 404 obtains, from the language switching table 700, information of the character string 703b (for example, " 片面→片面 " and " 片面→両面 ") corresponding to the window information 701d ("Duplex Window") relating to the setting item key and corresponding to the language name 702b, which is the different language (" 日本語 " (Japanese)). The character string changing unit 404 then notifies the display acceptance unit 401 that the information of the character string 703b is obtained.

In response to the notification, the display acceptance unit 401 displays the setting condition input window including the character string 703b thus obtained on the touch panel 201 (FIG. 6B: Step S205).

Figure 9B:
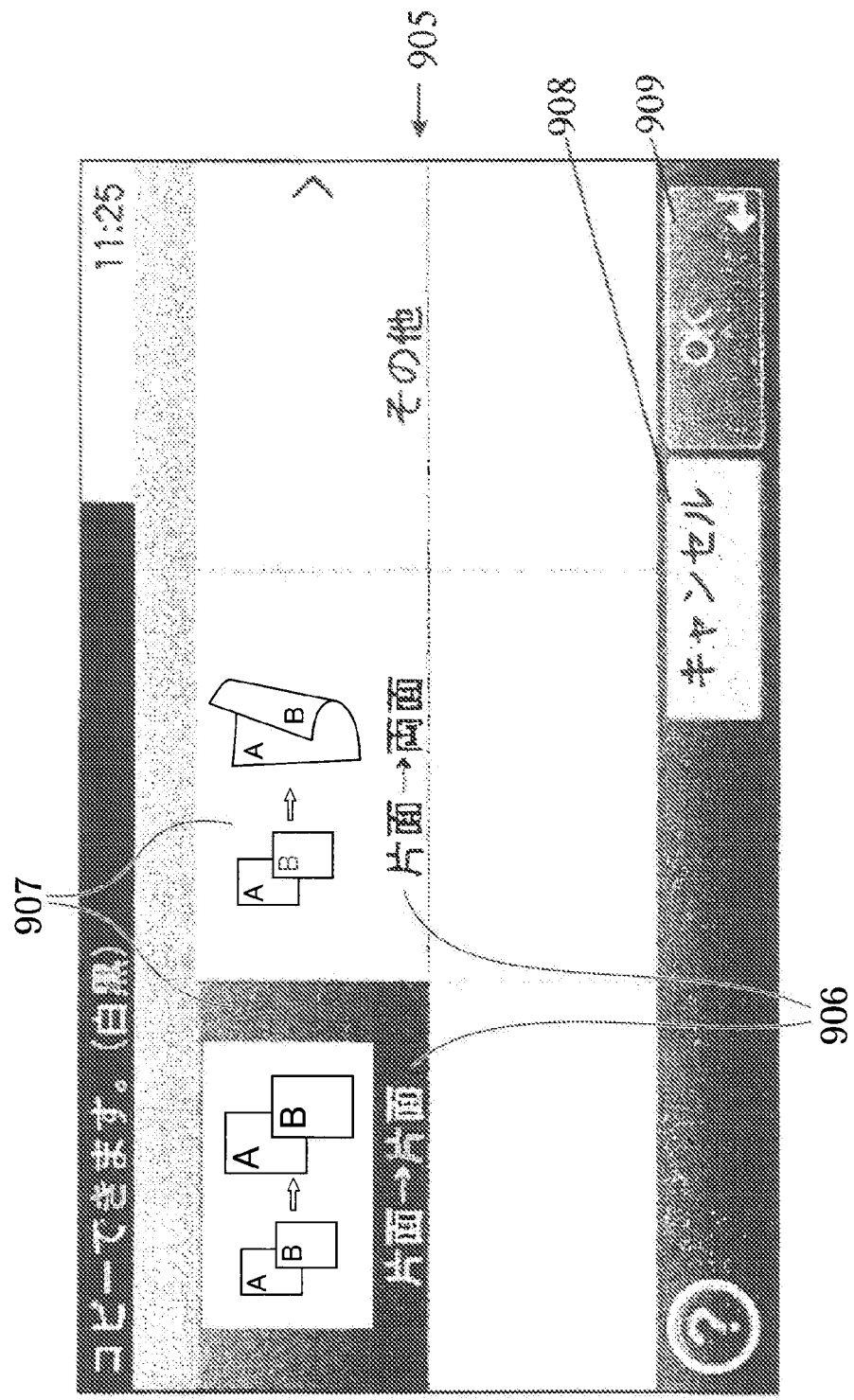
FIG. 9B is a second diagram showing an example of the setting condition input window displayed on the touch panel.

On the setting condition input window 905 with the character string being changed, as shown in FIG. 9B, a plurality of selecting item keys 907 (for example, " 片面→片面 " key, " 片面→両面 " key and the like), which is translated into the different language (" 日本語 " (Japanese)) and on which the third character string 906 relating to the setting item key (" 両面/分 割 " key) is displayed, the CANCEL key 908, and the OK key 909 are displayed so as to be pressable.

As a result, in the multifunction peripheral 100 (operation unit 102), if a setting item key translated into a different language is pressed (selected) and the operation window is switched from the initial window to the setting condition input window, the third character string displayed on the setting condition input window will also be in the different language displayed on the initial window.

The multifunction peripheral 100 (operation unit 102) is thus configured to allow easy input of setting conditions for the setting item key based on a character string displayed in the language after the change, without requiring a user to perform a language switching operation on each window switching. The multifunction peripheral 100 (operation unit 102) is configured to facilitate input of the setting conditions and to reduce the number of steps required for language switching.

The user looking at the setting condition input window 905 presses a particular selecting item key 907 (for example, "片面→両面" key) and then the OK key 909, the display acceptance unit accepts the pressure (input operation) on the "片面→両面" key (FIG. 6B: Step S206YES) based on the detection information provided by the touch panel 201 and changes the setting condition of "両面/分割" ("Duplex") among the setting conditions in the setting condition memory ("0" corresponding to the initial value "片面→片面") to "1" corresponding to "片面→両面" (FIG. 6B: Step S207). Input of the setting conditions for the setting item key after language switching is thus completed.

In addition, upon completion of input of a predetermined setting condition via the setting condition input window 905, the character string changing unit 404 clears information of the character string "両面/分割" and the language name "日本語 (Japanese)", which are temporarily stored in the character string changing memory (FIG. 6B: Step S208). The character string displayed in the different language is thus restored to the character string in the default language. The multifunction peripheral 100 (operation unit 102) can thus be configured to prevent unnecessary language switching of the character string.

Next, returning to Step S102, the display acceptance unit 401 displays the initial window reflecting the setting condition after change on the touch panel 201 (FIG. 5: S102). Since nothing is stored in the character string changing memory, all of the character strings displayed on the initial window are in the initial language ("English").

When a notification of completion of an operation input of a predetermined setting condition via the setting condition input window in which the third character string is displayed in the different language is accepted, the character string changing unit 404 switches the character string in the different language back to the character string in the language before change.

In Step S103, when the user presses the START key 205 after completing input of the predetermined setting condition (FIG. 5: Step S103YES), the display acceptance unit 401 accepts the pressing of the START key 205 and notifies a function providing unit 406 of the setting conditions being input so far.

In response to the notification, the function providing unit 406 performs the copy function based on the setting conditions (FIG. 5: S112). A copy function as desired by the user can thus be provided.

Here, the display acceptance unit 401 notifies the character string changing unit 404 of the pressure on the START key 205. In other words, the display acceptance unit 401 notifies the character string changing unit 404 of an instruction of execution of a predetermined function relating to the setting item.

In response to the notification, the character string changing unit 404 refers to the character string changing memory and, if information of the character string "両面/分割" and the language name "日本語" is temporarily stored in the character string changing memory, clears the information of the character string "両面/分割" and the language name "日本語" (FIG. 5: Step S113).

In response to the notification of instruction of execution of a predetermined function relating to the setting item, the character string changing unit 404 thus switches the character string in the different language back to the character string in a language before change.

As described above, in the multifunction peripheral 100, after providing a predetermined copy function, the character string displayed in the language after change on the operation window is automatically restored to the character string in the default language. The multifunction peripheral 100 is thus configured not to require a user to perform a switching operation to switch the language of the character string back to the default language. In addition, the multifunction peripheral 100 is configured to prevent confusion of a subsequent user due to lack of the switching operation.

In Step S202, on the different language switching key, when the user presses the character string 806 ("Duplex"), not the character string 807 ("両面/分割") (FIG. 6A: Step S202NO), the different language acceptance unit 405 accepts pressure (input operation) on the character string 806 based on detection information provided by the touch panel 201, clears the character string 807 of the different language switching key, and notifies the display acceptance unit 401.

In response to the notification, the display acceptance unit 401 displays the setting item key including a character string expressed in the initial language. And then, the display acceptance unit 401 accepts detection information of pressure on the START key (FIG. 5: Step S103) and pressure (input operation) of a predetermined setting item key (FIG. 5: Step S104).

When the process is advanced from Step S204 to Step S104 in a state in which the character string "両面/分割" is already stored in the character string changing memory, if the user presses (brief pressure) other setting item key 901 (for example, "Paper Selection" key) without pressing (brief pressure) the setting item key 902 with the character string being changed, the following processing takes place.

In other words, if the user presses the other setting item key 901 (FIG. 5: Step S104YES), the instruction detection unit 403 accepts information of the pressure (input operation) on the other setting item key 901 based on detection information provided by the touch panel 201, and detects whether pressure (input operation) on the other setting item key 901 continues or not (FIG. 5: Step S106) as described above.

Here, if the user releases the pressure on the other setting item key 901 immediately (FIG. 5: Step S106YES), the instruction detection unit 403 detects the pressure (input operation) on the other setting item key 901 based on the detection information provided by the touch panel 201. And then, the character string changing unit 404 accepts the pressure on the other setting item key 901 via the display acceptance unit 401 and determines whether the first character string "Paper Selection" included in the other setting item key 901 is identical to the character string stored in the character string changing memory ("両面/分割") or not (FIG. 5: Step S108).

Here, since the two character strings are not identical (FIG. 5: Step S108NO) as a result of the determination, the character string changing unit 404 notifies the display acceptance unit 401 of inconsistency.

In response to the notification, the display acceptance unit 401 refers to the language switching table 700 and obtains, from the language switching table 700, the information of the character string 703 that corresponds to the window information 701 "Paper Selection window" identifying the setting condition input window of the "Paper Selection" key and corresponds to the language name 702 "English" as the initial language. And then, the display acceptance unit 401 displays the setting condition input window including the character string 703 thus obtained on the touch panel 201 (FIG. 5: Step S109).

In this case, the setting condition input window including the character string in the initial language is displayed. This is a description for a case in which the other setting item key 901, for which the user does not desire language switching, is pressed. Therefore, the character strings displayed on the setting condition input window corresponding to the other setting item key 901 are displayed in the initial language, without being changed to character strings in the other language. The multifunction peripheral 100 (operation unit 102) can thus be configured to prevent unnecessary language switching of the character string.

When the user completes input of a predetermined setting condition via the setting condition input window of the other setting item key 901 (FIG. 5: Step S110YES to Step S111), the processing is returned to Step S102 and the display acceptance unit 401 displays the initial window reflecting the setting condition (FIG. 5: Step S102). Here, the character string "両 面/分割" and the language name "日本語" are still stored in the character string changing memory. Given this, the character string changing unit 404 displays, in the initial window displayed by the display acceptance unit 401, the character string of the setting item key ("Duplex") corresponding to the character string "両面/分割" and the character string relating to the setting item key ("1-sided>>1-sided") after changing to the character strings translated into the different language "日本語" ("両面/分割" and "片面→片面").

Therefore, even in a case in which the user tries to input the setting condition of the setting item key 902 of which language is switched, language switching of the first character string included in the setting item key 902 and the second character string relating to the setting item key 902 is maintained. As a result, in the multifunction peripheral 100 (operation unit 102), the user does not need to repeat the continuous pressure on the setting item key 902.

When the process is advanced from Step S204 to Step S104 in a state in which the character string "両面/分割" is already stored in the character string changing memory, if the user continuously presses the setting item key 902 ("両面/分割" key) with the character string being changed, the following processing takes place.

In other words, if the user presses the setting item key 902 (FIG. 5: Step S104YES), the instruction detection unit 403 accepts information of the pressure (input operation) on the setting item key 902 based on detection information provided by the touch panel 201, and detects whether pressure on the setting item key 902 continues or not (FIG. 5: Step S106) as described above.

And then, if the user continues pressing the setting item key 902 (FIG. 5: Step S106NO) and the elapsed time exceeds the predetermined time period (FIG. 5: Step S107YES), the instruction detection unit 403 detects that a changing instruction intended to change the character string "両面/分割" on the setting item key 902 to a character string expressed in a different language is input by the user's operation.

As in the above-described case, the different language acceptance unit 405 displays, in the vicinity of the character string "両面/分割" of the setting item key subjected to the changing instruction, the different language switching key including a character string translated into a language different from the language of the character string, in other words the character string "Duplex" in the initial language ("English"), such that an input operation on the different language switching key can be detected by the touch panel 201 (FIG. 6A: Step S201).

The multifunction peripheral 100 (operation unit 102) is thus configured to be able to switch the character string of the setting item key, which has once been switched to a different language name "日本語", back to the character string in the initial language "English". Description of the processing from Step S201 is the same as above and therefore omitted.

As described above, the operation unit 102 according to the present disclosure includes: the touch panel 201 including the display unit 201*a* that can display at least the initial window (first window) displaying a plurality of setting item keys on which the first character string and the second character string relating thereto are displayed, and the touch sensor 201*b* that detects an input operation on each of a plurality of software keys including the plurality of setting item keys, the plurality of software keys being displayed on the display unit; the instruction detection unit 403 that detects a changing instruction intended to change a character string displayed on a predetermined setting item key among the plurality of setting item keys to a character string in a different language, based on information relating to an input operation detected by the touch panel 201; the different language acceptance unit 405 that displays a language switching key including a character string in the different language corresponding to the first character string in the vicinity of the first character string displayed on the setting item key identified by the changing instruction thus detected, such that an input operation thereon can be accepted by the touch panel 201, upon detection of the changing instruction by the instruction detection unit 403; and the character string changing unit 404 that, upon detection of an input operation to the language switching key by the touch panel 201, changes the language of the first character string and the second character string to character strings in a predetermined different language, based on a content of the input operation detected by the touch panel.

As a result, the operation unit 102 is configured to allow, in a case in which a user cannot understand contents of a character string on a certain setting item key, switching of a character string into a character string translated into a different language in response to a predetermined operation by the user. The operation unit 102 can display the character string in a language familiar to the user, allowing the user to understand the content thereof at first glance. In addition, the operation unit 102 is configured to, upon reception of pressure (input operation) on the different language switching key, switch not only the character string on the setting item key, but also a character string relating thereto. As a result, the operation unit 102 is configured to allow a user to correctly understand contents of a character string on a setting item key subjected to language switching, a setting condition currently set, and the like.

When a setting condition input window allowing input of a setting item corresponding to the setting item key in which the language of the first character string and the second character string is changed to a different language is displayed on the touch panel 201, the character string changing unit 404 displays a third character string, which is displayed on the setting condition input window, after changing the language thereof to the same language as the first character string and the second character string.

The operation unit 102 switches a character string included in a setting condition input window relating to the setting item key to a character string in a different language specified by a user. As a result, the operation unit 102 is configured to facilitate input of a setting condition in the setting condition input window and to reduce the number of steps required for language switching.

In the operation unit 102 according to the embodiment of the present disclosure, the character string changing unit 404 is configured to, in a case of single-step switching from the initial window to the setting condition input window, display a character string relating to the setting item key on the setting condition input window after switching to a character string translated into the different language; however, the present disclosure is not limited thereto and can be configured otherwise. For example, the character string changing unit 404 can be configured to, even in a case in which a predetermined number of operation windows are present between the initial window and the setting condition input window, display a character string relating to the setting item keys respectively displayed on the predetermined number of operation windows after switching to a character string translated into a different language.

In the operation unit 102 according to the embodiment of the present disclosure, the instruction detection unit 403 is configured to detect the changing instruction intended to change the character string on the setting item key to a character string translated into a language different from a language of the character string, by detecting pressure on a predetermined setting item key by a user continuing for a predetermined period of time; however, the present disclosure is not limited thereto. For example, the instruction detection unit 403 can also be configured to detect the changing instruction by detecting an input operation consisting of two subsequent pressing operations on a predetermined setting item key based on detection information provided by the touch panel 201. In addition, the instruction detection unit 403 can also be configured to detect the changing instruction by detecting an input operation consisting of simultaneous two-point pressure on a predetermined setting item key based on detection information provided by the touch panel 201.

Furthermore, in the operation unit 102 according to the embodiment of the present disclosure, the different language acceptance unit 404 is configured to display the different language switching key in a form of a pull-down list; however, the present disclosure is not limited thereto. For example, the different language acceptance unit 404 can also be configured to switch the operation window to a different language switching window including the different language switching key, instead of displaying the different language switching key.

The operation unit 102 according to the embodiment of the present disclosure is employed in the multifunction peripheral having the copy function; however, the operation unit 102 can also be employed for a facsimile transmission function, a printing function and the like. In addition, in the embodiment of the present disclosure, the operation unit 102 has been described with regard to a case of being employed in the multifunction peripheral 100; however, the operation apparatus can be applied to various image forming apparatuses including various image processing apparatuses and the like. The operation apparatus can also be applied to various image display apparatuses and the like. Advantageous effects similar to those mentioned above can also be achieved with these configurations.

The present disclosure discloses a display control method for an operation apparatus provided with a touch panel including a display unit that can display at least a first window displaying a plurality of setting item keys on which a first character string and a second character string relating thereto are displayed, and a touch sensor that detects an input operation on each of a plurality of software keys including the plurality of setting item keys, the plurality of software keys being displayed on the display unit; the display control method including:

an instruction detection step in which the operation apparatus detects a changing instruction intended to change a character string displayed on a predetermined setting item key among the plurality of setting item keys to a character string in a different language, based on information relating to an input operation detected by the touch panel;

a different language acceptance step in which the operation apparatus displays a language switching key including a character string in a different language corresponding to the first character string in the vicinity of the first character string displayed on a setting item key identified by the changing instruction thus detected, such that an input operation thereon can be accepted by the touch panel, upon detection of the changing instruction by the instruction detection unit; and a character string changing step in which the operation apparatus, upon detection of an input operation to the language switching key by the touch panel, changes the language of the first character string and the second character string to character strings in a predetermined different language.

Furthermore, in the embodiment of the present disclosure, although the operation unit 102 was configured with various units, a configuration may include provision of a storage medium that enables storage of a program for realizing the respective units in the storage medium. In such a configuration, the operation unit 102 or the multifunction peripheral 100 reads the programs, thereby realizing the respective units by the operation unit 102 or the multifunction peripheral 100. In this case, the program read from the recording medium itself provides the advantageous effect of the present disclosure. Alternatively, steps executed by the various units can be provided as methods stored in a hard disk.

The present disclosure may also be provided as a program to be executed by a computer, independently distributed through telecommunication lines or the like. In this case, a central processing unit (CPU) realizes a control operation in cooperation with other circuits according to the program of the present disclosure.

The units realized by the program and the CPU can also be configured with specialized hardware. The program can be made available in a state of being recorded on a computer-readable recording medium, such as a CD-ROM.

The program is, for example, a computer-executable program for providing the display control method. In addition, the storage medium is a computer-readable storage medium that stores a program that causes a computer to execute the display control method.

What is claimed is:

1. An operation apparatus comprising:
a touch panel including a display unit that can display at least a first window corresponding to an initial window displaying a plurality of setting item keys on each of which a first character string and a second character string relating to each other are displayed in a first language, and a touch sensor that detects an input operation on each of a plurality of software keys including the plurality of setting item keys, the plurality of software keys being displayed on the display unit;

an instruction detection unit that detects a changing instruction intended to change a character string in the first language displayed on a setting item key to a character string in a second language differing from the first language, based on information relating to the input operation applied to the setting item key and detected by the touch panel;

a different language acceptance unit that displays a language switching key including the character string in the second language corresponding to the first character string in a vicinity of the first character string displayed on the setting item key identified by the changing instruction thus detected, such that an input operation thereon can be accepted by the touch panel, upon detection of the changing instruction by the instruction detection unit; and a character string changing unit that, upon detection of the input operation to the language switching key by the touch panel, changes the language of the first character string and the second character string to character strings in the second language, based on a content of the input operation detected by the touch panel, wherein changing of the language of the first character string and the second character string to the character strings in the second language performed by the character string changing unit is applied only to the setting item key, the changing instruction of which is detected by the instruction detection unit.

2. The operation apparatus according to claim 1, wherein the instruction detection unit detects the changing instruction in a case of detecting an input operation on a predetermined setting item key continuing for a predetermined period of time.

3. The operation apparatus according to claim 1, wherein the different language acceptance unit displays the language switching key in a form of a pull-down list.

4. The operation apparatus according to claim 1, wherein, when a setting condition input window allowing input of a setting item corresponding to a setting item key in which the language of the first character string and the second character string is changed to a different language is displayed on the touch panel, the character string changing unit displays a third character string, which is displayed on the setting condition input window, after changing a language of the third character string to the same language as the first character string and the second character string.

5. The operation apparatus according to claim 4, wherein, when a notification of completion of an operation input of a predetermined setting condition via the setting condition input window in which the third character string is displayed in the different language or a notification of instruction of execution of a predetermined function relating to the setting item is accepted, the character string changing unit switches the character string in the different language back to the character string in a language before change.

6. An image forming apparatus comprising an operation apparatus including:
   a touch panel including a display unit that can display at least a first window corresponding to an initial window displaying a plurality of setting item keys on each of which a first character string and a second character string relating to each other are displayed in a first language, and a touch sensor that detects an input operation on each of a plurality of software keys including the plurality of setting item keys, the plurality of software keys being displayed on the display unit;
   an instruction detection unit that detects a changing instruction intended to change a character string in the first language displayed on a setting item key to a character string in a second language differing from the first language, based on information relating to the input operation applied to the setting item key and detected by the touch panel;
   a different language acceptance unit that displays a language switching key including the character string in the second language corresponding to the first character string in a vicinity of the first character string displayed on the setting item key identified by the changing instruction thus detected, such that an input operation thereon can be accepted by the touch panel, upon detection of the changing instruction by the instruction detection unit; and
   a character string changing unit that, upon detection of the input operation to the language switching key by the touch panel, changes the language of the first character string and the second character string to character strings in the second language, based on a content of the input operation detected by the touch panel,
   wherein changing of the language of the first character string and the second character string to the character strings in the second language performed by the character string changing unit is applied only to the setting item key, the changing instruction of which is detected by the instruction detection unit.

7. The image forming apparatus according to claim 6, wherein the instruction detection unit detects the changing instruction in a case of detecting an input operation on a predetermined setting item key continuing for a predetermined period of time.

8. The image forming apparatus according to claim 6, wherein the different language acceptance unit displays the language switching key in a form of a pull-down list.

9. The image forming apparatus according to claim 6, wherein, when a setting condition input window allowing input of a setting item corresponding to a setting item key in which the language of the first character string and the second character string is changed to a different language is displayed on the touch panel, the character string changing unit displays a third character string, which is displayed on the setting condition input window, after changing a language of the third character string to the same language as the first character string and the second character string.

10. The image forming apparatus according to claim 9, wherein, when a notification of completion of an operation input of a predetermined setting condition via the setting condition input window in which the third character string is displayed in the different language or a notification of instruction of execution of a predetermined function relating to the setting item is accepted, the character string changing unit switches the character string in the different language back to the character string in a language before change.

11. A display control method for an operation apparatus provided with a touch panel including a display unit that can display at least a first window corresponding to an initial window displaying a plurality of setting item keys on each of which a first character string and a second character string relating to each other are displayed in a first language, and a touch sensor that detects an input operation on each of a plurality of software keys including the plurality of setting item keys, the plurality of software keys being displayed on the display unit; the display control method comprising:
   an instruction detection step in which the operation apparatus detects a changing instruction intended to change a character string in the first language displayed on a setting item key to a character string in a second language differing from the first language, based on information relating to an input operation applied to the setting item key and detected by the touch panel;
   a different language acceptance step in which the operation apparatus displays a language switching key including a character string in the second language corresponding to the first character string in a vicinity of the first character string displayed on the setting item key identified by the changing instruction thus detected, such that an input operation thereon can be accepted by the touch panel, upon detection of the changing instruction by the instruction detection unit; and a character string changing step in which the operation apparatus, upon detection of the input operation to the language switching key by the touch panel, changes the language of the first character string and the second character string to character strings in the second language, based on a content of the input operation detected by the touch panel, wherein changing of the language of the first character string and the second character string to the character strings in the second language performed in the character string changing step is applied only to the setting item key, the changing instruction of which is detected in the instruction detection step.

12. A non-transitory storage medium that stores a program that causes a computer to execute the display control method according to claim 11, wherein the storage medium is computer-readable.

* * * * *